Dec. 24, 1929.  R. N. MURPHY  1,740,902
SANITARY TRAP FITTING
Original Filed March 24, 1925

ROBERT NICHOLAS MURPHY
INVENTOR.

By Marks & Clerk

ATTORNEYS.

Patented Dec. 24, 1929

1,740,902

UNITED STATES PATENT OFFICE

ROBERT NICHOLAS MURPHY, OF OTTAWA, ONTARIO, CANADA, ASSIGNOR OF TWENTY-EIGHT AND THREE-FOURTHS PER CENT TO THE ESTATE OF JAMES S. WILSON, DECEASED, AND OF ELEVEN AND ONE-FOURTH PER CENT TO HARRY R. MEREDITH, OF OTTAWA, ONTARIO, CANADA

SANITARY TRAP FITTING

Original application filed March 24, 1925, Serial No. 17,875. Divided and this application filed March 14, 1927. Serial No. 175,362.

This invention relates to sanitary trap fittings intended for use in connection with basins, sinks and the like and more particularly to that type known as the wall type trap.

The main object of the invention is to provide an improved trap fitting that will enable the trap, vent and waste pipe to be flushed without dismantling the trap.

According to the present invention the fitting comprises a waste outlet and a vent outlet, an extended neck to reach under a sanitary fixture and forming the waste inlet of said fitting, means to connect said neck with said fixture, and a bore in said neck to receive means to flush said waste, said vent or said fixture connecting means.

Figure 1:
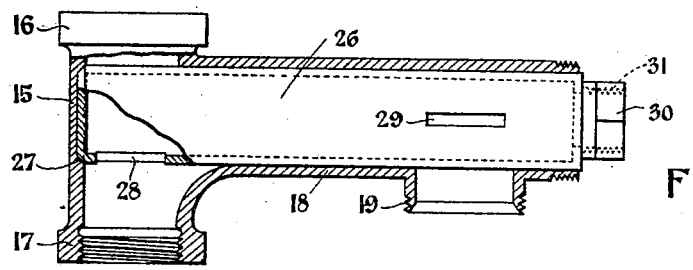
Figure 2:
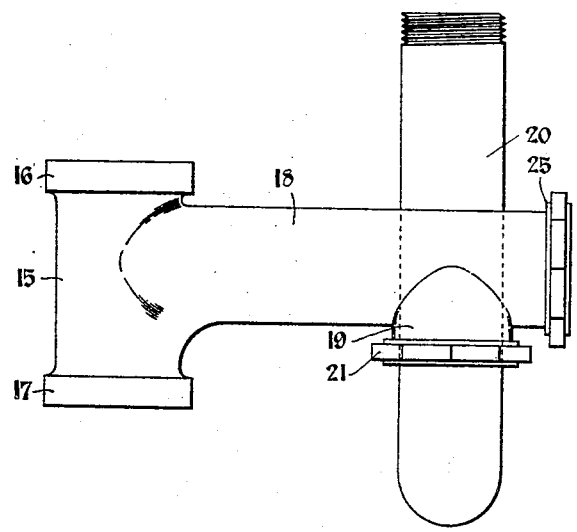
Figure 3:
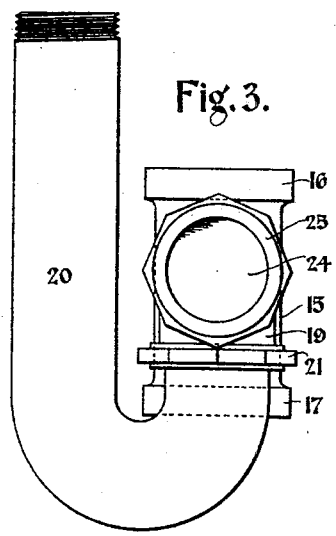
Figure 4:
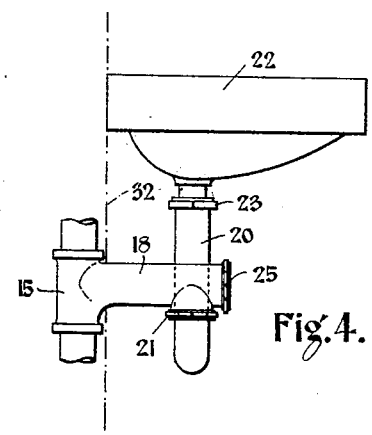

Referring now to the accompanying drawings which illustrate, by way of example, one convenient embodiment of the invention, Figure 1 is a side elevation of the improved fitting, partly in section, showing the flushing plug positioned therein, Figure 2 is a side elevation of the fitting, Figure 3 is an end view thereof, and Figure 4 is a side elevation on a smaller scale showing the fitting connected to a basin or sink.

The improved fitting comprises a body portion 15 having an outlet connection 16 for a vent pipe and an outlet connection 17 for a waste pipe. The fitting is formed with an extended lateral branch 18 having a connection 19 for a trap 20.

The trap 20 is shown as being of J formation, the shorter arm being secured to connection 19 by means of a nut 21 while the longer arm is secured to the outlet of a basin or similar fixture 22 as by means of a nut 23.

The end of the extended branch 18 is normally closed by means of a disc 24 held in place by the nut 25.

When it is desired to flush the trap, vent or waste pipe, the nut 24 is removed and a hollow plug 26 is inserted in the extended branch 18 which may also be held in place by the nut 24. The inner end of the plug 26 is closed and may have a chamfered edge 27 to engage a correspondingly shaped seat in the interior of the body 15. The plug is formed with apertures 28 and 29 arranged out of alignment with each other in such manner that when the plug is turned to bring the aperture 28 into register with the vent 16 or the waste outlet 17, the aperture 29 is out of register with the trap connection 19. Similarly if the aperture is registered with trap connection 19, the aperture is out of register with both the vent 16 and waste outlet 17.

The outer end of plug 26 may be squared as at 30 or otherwise suitably formed to be engaged by a wrench or other convenient tool, and is provided with a screw threaded connection 31 for a hose, not shown, by means of which fluid under pressure may be introduced into the interior of the plug.

From Figure 4 it will be seen that the improved fitting may be easily connected to a fixture by a trap to form a convenient arrangement of neat and attractive appearance. In Figure 4 the line 32 represents the wall, the body portion 15 of the fitting being arranged behind the wall and the major portion of the branch 18 extending beyond the outer surface of the wall so as to extend a distance sufficient to bring the trap connection 19 vertically beneath the outlet of the fixture 22.

What I claim is:—

A sanitary trap fitting comprising a cylindrical body portion forming a vent outlet at one end and a waste outlet at the other, an extended branch communicating with said body portion and arranged at right angles thereto, a connection at right angles to said branch and arranged to be connected by a trap to a sanitary fixture, said branch being of such length that the trap connection extends to a position vertically beneath the sanitary fixture and being bored longitudinally, in combination with a hollow flushing plug closed at one end and provided with an aperture which may be registered with the vent or waste outlet and another aperture which may be registered with the trap connection.

In testimony whereof I affix my signature.

ROBERT NICHOLAS MURPHY.